Feb. 19, 1957 L. T. O'CONNOR 2,781,832
BURNER FOR GLASS BLOWING LATHE
Filed Aug. 11, 1953
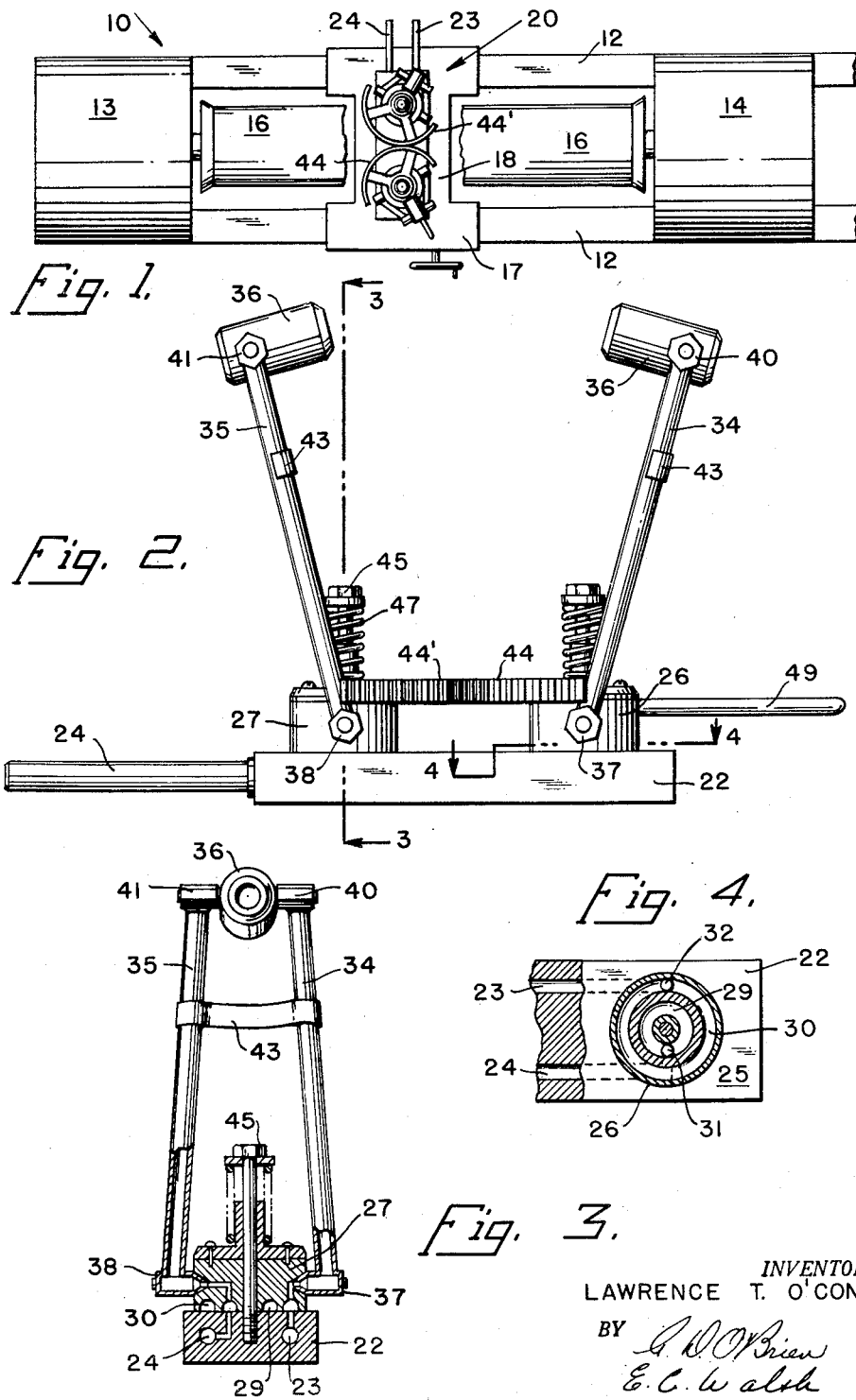
INVENTOR.
LAWRENCE T. O'CONNOR United States Patent Office 2,781,832
Patented Feb. 19, 1957

2,781,832
BURNER FOR GLASS BLOWING LATHE
Lawrence T. O'Connor, Benson, Ariz.
Application August 11, 1953, Serial No. 373,698
3 Claims. (Cl. 158—99)
(Granted under Title 35, U. S. Code (1952), sec. 266)

This invention relates to improvements in burner devices utilized in glass blowing. In this art it has been customary to mount the work, that is, the glass tube or other element being worked on, in a lathe and to heat the work with gas burners while it is so mounted to render it sufficiently plastic so that it can be worked into the desired shape. One type of lathe which is used for this purpose is known as the Litton type lathe which is similar to conventional engine lathes except that both the tail stock and head stock are power driven. The glass tube or the like may be clamped at its end in collets in the head stock and tail stock and the burner flame applied at the desired point along the length of the tube or the like.

Burner arrangements, as used in the past, have suffered from the deficiency that they were insufficiently flexible in regard to their characteristics as respects adjustment relative to the work and in securing uniform application of heat to the work in the desired manner. Ordinarily, it is desired that burners be provided on both sides of the work and, of course, accommodations must be normally provided normally for conveying a combustible gas and oxygen to the burner head or tip.

It is an object of this invention to provide a burner arrangement capable of overcoming the deficiencies of prior known burners of this type, and to provide an assembly of burner heads offering greater flexibility of adjustment and facilitating and making more convenient the desired adjustment of the burner heads for securing uniform application of heat to the work in the desired manner.

It is another object of the invention to provide an assembly of a group of burner heads adapted for heating work mounted in a lathe of the type described wherein the burner heads are arranged for rotation about a vertical axis and wherein they are mutually interconnected whereby motion of one effects mutually similar or symmetrical motion of the other.

As a corollary to the above object, the objective is achieved of enabling the burner heads to be moved out of a line which is normal to the work so as to be positioned at an angle to the work, the angles assumed by two or more burners being similar.

An additional object is to provide a burner assembly as in the foregoing wherein each burner is mounted to be rotatable about a horizontal axis as well as a vertical axis and wherein the burner head itself is pivotally mounted to pivot about a horizontal axis.

Other objects and numerous advantages of the invention will become apparent from the following detailed description and annexed drawings wherein:

Fig. 1 is a schematic view of a lathe having the burner assembly of this invention associated therewith.

Fig. 2 is a view of the burner assembly of this invention.

Fig. 3 is a cross section disassembled or exploded view of the burner assembly showing the individual parts in detail.

Fig. 4 is a cross section taken on line 4—4 of Fig. 2.

Referring to Fig. 1 of the drawings, numeral 10 designates a lathe which may be of the Litton type, for example. The lathe comprises a lathe bed 12. The lathe has a power driven head stock 13 and a tail stock 14, both of which are power driven in this particular type of lathe. Mounted between the head stock and tail stock is the material being worked on, which is shown by way of example as being a glass tube 16. The lathe bed has a longitudinally movable carriage 17, as is conventional, and this carriage has a cross feed 18 as shown. The burner assembly 20 of this invention is mounted as shown on the cross feed 18 of the lathe. As may be seen, the burner assembly includes burner heads at opposite sides of the material being worked on.

Referring now to Figs. 2 and 3 of the drawings, the burner assembly of this invention comprises a base 22 in the form of a rectangular block of steel which has entrance ports and tubes 23 and 24 for the admission of combustible gas and oxygen which are conveyed to the burner heads or tips, as will be described. One face 25 of the block 22 is precision ground and there are two circular brass blocks 26 and 27 which have precision ground faces which fit against the corresponding faces of block 22. These blocks form the rotatable supports for the burner heads, as will be described. In the precision ground faces of each of blocks 26 and 27 are concentric annular grooves or depressions which are machined therein as shown at 29 and 30 (see Figs. 3 and 4). As illustrated in Fig. 4, the channels 29 and 30 register with and provide communication with ports 31 and 32 in the block 22 and these ports, in turn, communicate with the tubes 23 and 24. Communication of gas and oxygen is thus provided to the block 26 and to the burner head, as will be described. Since the construction and the mounting of the two burner heads shown is identical, the details with respect to only one will be described.

Numerals 34 and 35 designate tubes in the form of burner arms which support burner head or tip 36 and the lower ends of these tubes engage in rotatable fittings 37 and 38 in opposite sides of the block 26 and which provide communication respectively by way of ports in block 26 with the annular channels 29 and 30. The upper ends of the tubes 34 and 35 engage in similar fittings 40 and 41 which are rotatably or pivotally secured in opposite sides of the burner head 36 and they provide communication of gas and oxygen to the burner head itself. Numeral 43 designates a spring clamping bracket engaged between the tubes 35 and 34.

In the assembled positions of the parts as shown in Fig. 2 it may be seen that each individual burner head assembly includes a sector gear as shown at 44 in this figure. Sector gear 44 is of substantially 180° in extent and it has a central hub which is attached to the upper part of the block 26 by screws as shown. A bolt 45 extends through a coiled compression spring 47 through the hub of the sector gear 44 and through the block 26 and engages the base 22. By adjusting bolt 45 the compression of spring 47 can be varied and thus the pressure between the precision faces of blocks 26 and 22. In this way the gas seal formed by these faces is controlled. The individual burner assembly and mounting arms or tubes is thus rotatably mounted from the block 26 which may be operated by a handle 49. The assembly of the mounting of the other burner head is identified by similar numerals and it has a similar sector gear 44'. It can be seen, therefore, that when the assembly of the individual burner head 36 is rotated by handle 49, the other burner head is similarly rotated by means of the sector gears, the other gear being similarly rotated but in the other direction. It may be seen, therefore, that the two burner heads can be very easily rotated out of a line normal to the work so that they are directed at similar angles relative to the work and thus the application of heat thereto can be very nicely and uniformly adjusted and applied. By reason of the rotatability of the arms or tubes 34 and 35 and the similar fittings for the other burner head, both heads can be very conveniently adjusted to provide the desired degree of heating. Similarly, each burner head can be adjusted by itself on its horizontal axis through the upper ends of the mounting arms of the tubes to provide adjustment in a vertical plane of the direction of the flame relative to the work.

From the foregoing, those skilled in the art will observe that I have provided an improved burner arrangement and assembly particularly adapted for use and application in connection with a glass blowing lathe. Superior results can be achieved in the work of glass blowing due to the improvements provided. Greater flexibility is provided in the adjustment of the burner heads and greater uniformity can be achieved in the application of heat to different parts of the work particularly when it is desired that the heat be supplied symmetrically. The foregoing disclosure is illustrative of the principle of the invention and of a preferred form of adaptation thereof.

Various modifications may be made by those skilled in the art without departing from the principle of the invention as disclosed herein. It is intended that the disclosure be interpreted in an illustrative rather than a limiting sense, with the limits and boundaries of the invention being determined in accordance with the claims appended hereto.

The invention described herein may be manufactured and used by or for the Government of the United States of America for governmental purposes without the payment of any royalties thereon or therefor.

What is claimed is:

1. In apparatus of the character described, a base, a pair of supporting blocks pivotally mounted on said base at spaced points for angular adjustment about spaced axes substantially perpendicular to said base, a pair of burner heads, each of said heads having an arm carrying the respective head, means mounting one of said arms on each of said supporting blocks, means for conveying combustible gases to the burner heads, each of said supporting blocks having a sector gear mounted thereon, the gear teeth of said sector gears engaging one another, whereby simultaneous complementary angular adjustment of the position of both of said supporting blocks and of the burner heads carried thereby may be effected by angular displacement of either one of said blocks, each of said arms being pivotally mounted on its respective supporting block for pivotal movement about an axis perpendicular to the axis of said supporting block.

2. In apparatus of the character described, a base, a pair of supporting blocks pivotally mounted on said base at spaced points for angular adjustment about spaced axes substantially perpendicular to said base, a pair of burner heads, each of said heads having an arm carrying the respective head, means mounting one of said arms on each of said supporting blocks, means for conveying combustible gases to the burner heads, each of said supporting blocks having a sector gear mounted thereon, the gear teeth of said sector gears engaging one another, whereby simultaneous complementary angular adjustment of the position of both of said supporting blocks and of the burner heads carried thereby may be effected by angular displacement of either one of said blocks, each of said burner heads being pivotally attached to its respective arm for pivotal movement about an axis perpendicular to the axis of its respective supporting block.

3. In apparatus of the character described, a base, a pair of supporting blocks pivotally mounted on said base at spaced points for angular adjustment about spaced axes substantially perpendicular to said base, a pair of burner heads, each of said heads having an arm carrying the respective head, means mounting one of said arms on each of said supporting blocks, means for conveying combustible gases to the burner heads, each of said supporting blocks having a sector gear mounted thereon, the gear teeth of said sector gears engaging one another, whereby simultaneous complementary angular adjustment of the position of both of said supporting blocks and of the burner heads carried thereby may be effected by angular displacement of either one of said blocks, each of said arms being pivotally mounted on its respective supporting block for pivotal movement about an axis perpendicular to the axis of said block, each of said burner heads being pivotally attached to its respective arm for pivotal movement about an axis parallel to the pivotal axis of the respective arm.

References Cited in the file of this patent

UNITED STATES PATENTS

| | | |
|---|---|---|
| 774,456 | Smith | Nov. 8, 1904 |
| 1,879,886 | Schifferle | Sept. 27, 1932 |
| 2,288,537 | Malloy | June 30, 1942 |
| 2,593,295 | Granfield | Apr. 15, 1952 |